UNITED STATES PATENT OFFICE 2,610,215

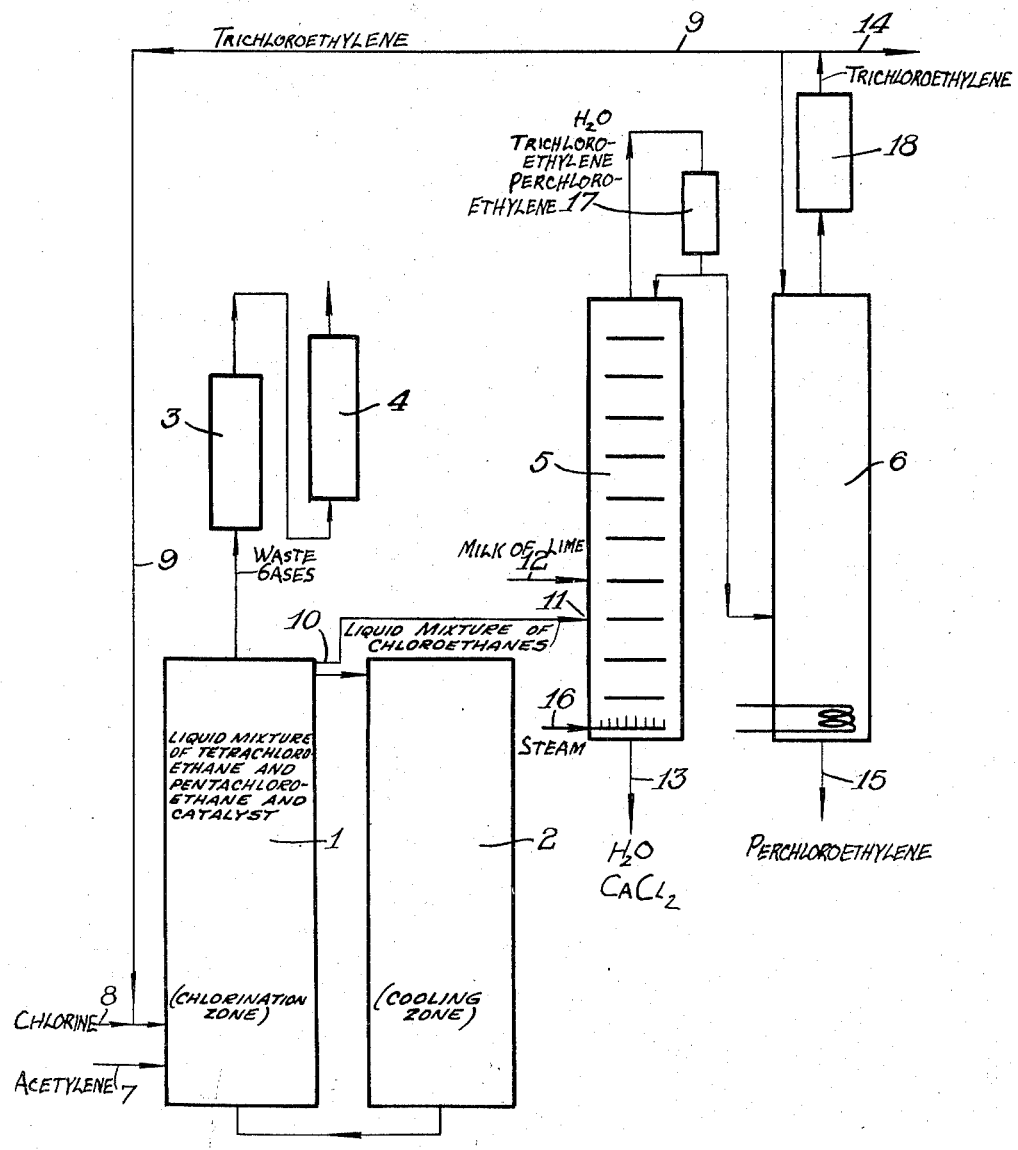

PROCESS OF MANUFACTURING CHLORINATED HYDROCARBONS

Lambert Vanharen, Ixelles-Brussels, Belgium, assignor to Solvay & Cie, Brussels, Belgium, a Belgian company Application April 11, 1950, Serial No. 155,265
In Belgium April 26, 1949

3 Claims. (Cl. 260—654)

The invention relates to a cyclic process of simultaneously manufacturing at least two chlorinated ethylene hydrocarbons.

Amongst the various known processes, the most current process for the preparation of a chloroethylene hydrocarbon consists in preparing the immediately highly saturated chlorinated hydrocarbon and in freeing it from hydrochloride by the action of an alkali or of heat.

Thus, trichloroethylene is prepared by first carrying out the synthesis of tetrachloroethane from acetylene and chlorine, and then splitting up the tetrachloroethane into trichloroethylene and hydrogen chloride.

Similarly, monochloroethylene is obtained by preparing 1.2-dichloroethane from ethylene and chlorine, the dichloroethane then being split up into monochloroethylene and hydrogen chloride.

When it is desired to prepare a plurality of non-saturated ethylene compounds, for example trichloroethylene and perchloroethylene, it is therefore first necessary to prepare the immediately higher saturated chlorinated hydrocarbons. In the example selected, these are tetrachloroethane and pentachloroethane.

It has recently been proposed to prepare simultaneously these chloroethanes by combining the additive chlorination of an unsaturated hydrocarbon with the substitutive chlorination of the resulting saturated chlorinated hydrocarbon. Thus by effecting the photochemical chlorination of acetylene in the absence of addition catalysts, it has been found possible to prepare simultaneously tri-, tetra-, and pentachloroethane. Nevertheless, in these circumstances the hydrogen chloride released by substitutive chlorination carries off with it considerable amounts of the hydrocarbon, which consequently does not react with the chlorine in liquid phase but, in the case of acetylene for example, gives rise in gaseous phase to an explosive reaction with the chlorine.

The process most generally utilized hitherto consisted in effecting successive chlorinations and dehydrochlorinations, in separate apparatus, in order to obtain the desired hydrocarbons.

Returning to the example of the preparation of tri- and perchloroethylene, the successive reactions are the following:

$$C_2H_2 + 2Cl_2 \rightarrow C_2H_2Cl_4 \quad (1)$$
$$C_2H_2Cl_4 \rightarrow C_2HCl_3 + HCl \quad (2)$$
$$C_2HCl_3 + Cl_2 \rightarrow C_2HCl_5 \quad (3)$$
$$C_2HCl_5 \rightarrow C_2Cl_4 + HCl \quad (4)$$

By similar reactions it is possible to prepare monochloroethylene and 1.1-dichloroethylene from ethylene and chlorine, by passing through 1.2-di- and 1.1.2-trichloroethane.

The additive chlorination of the originating hydrocarbons is generally effected in liquid phase in a mutual solvent of the hydrocarbon and of chlorine, this solvent being most frequently constituted by chloroethane itself.

The speeds of these chlorination reactions are limited by the speeds of dissolution of the hydrocarbon and chlorine. When using chloroethane as a solvent and reaction medium, the solubility of chlorine is very great and the process is solely limited by the speed of dissolution of the hydrocarbon. The capacity of the chlorination apparatus is thus limited by the speed of dissolution of the latter. If the hydrocarbon is introduced into the chlorinator at a speed higher than its speed of dissolution, a part passes through the liquid bath without dissolving or reacting, and escapes with the residuary gases. In the particular case of reaction (1), this presents very great inconvenience in view of the fact that, as stated hereinabove, acetylene and chlorine react explosively in the gaseous phase.

One of the objects of the present invention is to provide a process permitting the increasing of the capacity of chlorination of these apparatus, while keeping at least constant the capacities of production of chloroethane based on the additive reactions of chlorine with the unsaturated hydrocarbons.

Another object resides in a cyclic process for the simultaneous production of at least two ethylene hydrocarbons by synthesis of chloroethanes and dehydrochlorination of the latter.

It is based on the surprising fact that it is possible to obtain these results by simultaneously effecting, in the liquid phase, the additive chlorinations which hitherto have been carried out successively.

For this purpose, according to the invention, there are introduced into a chlorinator, on the one hand, an unsaturated hydrocarbon and the amount of chlorine corresponding to the additive chlorination of said hydrocarbon and, on the other hand, at least one chlorinated ethylene hydrocarbon and the amount of chlorine corresponding to the additive chlorination of the latter, said chlorinated ethylene hydrocarbons being obtained by dehydrochlorination of the corresponding chloroethanes.

The accompanying diagrammatic drawing shows by way of example one method of carrying out the process in its particular application to the simultaneous preparation of tri- and perchloroethylene from acetylene and chlorine.

Into a chlorinator 1, which contains a mixture of tetra- and pentachloroethane and also a catalyst normally used for the additive chlorination of hydrocarbons (for example ferric chloride), there are introduced, on the one hand, acetylene at 7 and chlorine at 8 in the molecular ratio substantially equal to 1:2, and on the other hand trichloroethylene at 9 and chlorine, also at 8, in the molecular ratio substantially equal to 1:1.

The trichloroethylene introduced into the chlorinator comes from the separation of the tri-perchloroethylene mixture obtained by splitting up the mixture of tetra- and pentachloroethane.

The method of distribution of the reagents in the chlorinator is not critical; nevertheless, as suggested in British specification No. 604,334, it is possible to dissolve separately one or more of the reagents and to effect the mixing in the chlorination apparatus.

The latter is connected to a cooler 2 fed with steam or water in such manner that by circulation of the mixture of the products of the reaction a substantially constant temperature is maintained at the top and bottom of the chlorinator, the difference between these two temperatures being advantageously as small as possible.

During the course of the process of chlorination, the flow of acetylene and that of chlorine are regulated so as to obtain a slight excess of chlorine in solution in the chlorination foot constituted by the tetra-pentachloroethane mixture.

The residual gases, practically free from $C_2H_2$, are cooled in a condenser 3, in order to recycle the chloroethanes carried by them, and are then washed in an absorber-scrubber 4 before being passed to the atmosphere.

The mixture of chloroethanes formed is withdrawn at 10 and passed on to dehydrochlorination. This operation may be effected by thermal dissociation or else by chemical reaction with an alkaline solution. In the method of operating illustrated, the mixture is introduced at 11 on the bottom platforms of a column 5, while milk of lime is introduced above the chloroethanes at 12. The column is heated by the introduction of live steam at 16. From the top of this column passes out a tri-perchloroethylene-water mixture to a condenser 17, whence a part of this mixture flows back to the column while the other part is introduced after drying to the rectifying column 6. From the base of the column 5 is taken at 13 the aqueous solution of $CaCl_2$, as well as any traces of hexachloroethane. At the top of the column 6 is removed the trichloroethylene which is condensed at 18, and of which a fraction is taken as finished product at 14, while the other fraction is recycled to the chlorinator through the pipe 9.

At the base of the rectification column, at 15, the perchloroethylene is removed.

Without departing from the scope of the invention, the cycle described above can obviously be substantially modified.

In particular, it is possible to replace the rectification of the tri-perchloroethylene mixture by a rectification of the tetra-pentachloroethane mixture, the dissociation of the chloroethanes being then carried out by thermal or chemical means on each of the products rectified.

The invention is not limited solely to the simultaneous preparation of tri- and perchloroethylene by chlorination of acetylene and recycled trichloroethylene. It is also applicable to the preparation of other ethylene hydrocarbons, particularly monochloroethylene and 1.1-dichloroethylene.

In this case di- and trichloroethane are prepared simultaneously by chlorination of ethylene and monochloroethylene which is recycled, the latter being obtained in per se known manner by thermal or chemical dissociation of 1.2-dichloroethane.

As it has been stated above, the invention aims at the formation of chloroethane by additive reactions. Nevertheless, it is known that in the synthesis of tetrachloroethane, for example, small amounts of pentachloroethane are inevitably produced. It is not necessary to attempt to avoid this secondary reaction, because the process of the invention likewise leads to the formation of pentachloroethane by chlorination of trichloroethylene obtained by dehydrochlorination, outside the reactor, from a part of the tetrachloroethane produced. It is even possible to produce chloroethane substitution reactions and to combine the process of the invention with known processes of chlorination by substitution; in this manner it would be possible to vary at will the ratio between the amounts of chloroethylene desired, not only by acting on the amount of chloroethylene recycled, but also by effecting the substitution of the chloroethane obtained by additive chlorination of the unsaturated hydrocarbon; nevertheless, this would obviously be at the expense of the capacity of production of the chlorinator.

The reactions of formation of the chloroethanes being highly exothermic, it is important that the cooling should be sufficiently effective to be able to maintain the temperature in the chlorinator within the limits compatible with the good running of the process. These conditions being fulfilled, the process has the advantage of permitting the carrying out, in a pre-existing apparatus, of at least one supplementary addition reaction without reducing the capacity of absorption of hydrocarbon of the apparatus.

The process according to the invention therefore offers the advantage of permitting the preparation in existing installations of at least two chlorinated ethylene hydrocarbons without reducing the daily capacity of the installations, while requiring as supplementary capital outlay only the apparatus necessary for the separation of the mixtures prepared.

The process is particularly interesting for the simultaneous preparation of tri- and perchloroethylene which, by reason of their different properties, vapour tension, solvent power, and toxicity, both have, either alone or mixed, various applications as solvents.

The process is likewise interesting for the simultaneous production of mono- and 1.1-dichloroethylene, these products, isolated or in mixture, being used as starting material for the preparation of synthetic plastic materials.

*Example*

Into an apparatus normally used for the production of tetrachloroethane by additive chlorination of acetylene, and having a maximum capacity of production of tetrachloroethane of 3600 kg. per diem for mean temperatures in the chlorinator of 85° C. at the bottom and 110° C. at the top, there are introduced, in addition to the amounts of acetylene and chlorine necessary for the synthesis of the 3600 kg. of tetrachloroethane, 800 and 426 kg. per diem respectively of trichloroethylene and chlorine. When working is under way, the mixture of chloroethanes produced contains 26% of pentachloroethane.

By dehydrochlorination of these chloroethanes, a mixture of tri- and perchloroethylene is obtained, from which 800 kg. per diem of trichloroethylene are separated for recycling and of which substantially 2000 kg. per diem of tri- and 1000 kg. per diem of perchloroethylene are taken as finished product.

No modification having been made to the system of cooling, the mean temperatures in the reactor have risen respectively to 92.5° C. at the bottom and 125° C. at the top. Despite this rise in the temperature of the solvent, the amount of $C_2H_2$ in the residual gases remained negligible. This seems to show that at the same temperature the solubility of acetylene in the reacting medium is higher than its solubility in tetrachloroethane alone. This result may seem surprising in view of the fact that within these temperature limits the solubility of acetylene is lower in tetra- pentachloroethane mixtures than in tetrachloroethane alone.

This example shows that in an apparatus of given size for producing tetrachloroethane it is possible to produce a supplementary reaction by chlorinating trichloroethylene into pentachloroethane without reducing the hourly production of tetrachloroethane.

I claim:

1. In a cyclic process for the simultaneous production of trichloroethylene and perchloroethylene, the steps which comprise simultaneously introducing chlorine gas, acetylene and trichloroethylene into a chlorination zone substantially filled with a mixture of tetrachloroethane and pentachloroethane in the liquid phase, said acetylene being introduced at the maximum rate compatible with no free acetylene reaching the top of the chlorination zone and said chlorine gas being introduced at a rate slightly in excess of that stoichiometrically required for the additive chlorination of both said acetylene and said trichloroethylene, thereby forming tetrachloroethane and pentachloroethane, withdrawing the reaction mixture from the chlorination zone subjecting said mixture to dehydrochlorination, whereby to obtain a mixture of trichloroethylene and perchloroethylene, separating said trichloroethylene from said perchloroethylene, withdrawing a portion of said trichloroethylene and returning the remaining portion of said trichloroethylene to said chlorination zone.

2. In a cyclic process as claimed in claim 1, circulating the reacting mixture through a cooling zone to maintain the top of the chlorinator at a temperature only slightly above the temperature at the bottom thereof.

3. In a cyclic process as defined in claim 1, circulating the reacting mixture through a cooling zone to maintain the top of the chlorination zone at a temperature not substantially exceeding 125° C.

LAMBERT VANHAREN.

REFERENCES CITED

The following references are of record in the file of this patent:

UNITED STATES PATENTS

| Number | Name | Date |
|---|---|---|
| 2,280,794 | Cass | Apr. 28, 1942 |